Jan. 18, 1966     J. W. MAYO ETAL     3,229,636
MISSILE STAGE SEPARATION INDICATOR AND STAGE INITIATOR
Filed Feb. 27, 1964     2 Sheets-Sheet 1

INVENTORS
JAMES W. MAYO
JAMES E. MICHAEL

BY

*William H. King*
ATTORNEYS

United States Patent Office 3,229,636
Patented Jan. 18, 1966

3,229,636
MISSILE STAGE SEPARATION INDICATOR AND STAGE INITIATOR
James W. Mayo, Newport News, and James E. Michael, Hampton, Va., assignors to the United States of America as represented by the Administrator of the National Aeronautics and Space Administration
Filed Feb. 27, 1964, Ser. No. 347,960
25 Claims. (Cl. 102—49)
(Granted under Title 35, U.S. Code (1952), sec. 266)

The invention described herein may be manufactured and used by or for the Government of the United States of America for governmental purposes without the payment of any royalties thereon or therefor.

This invention relates to the use of piezoelectric elements and has particular reference to the use of piezoelectric elements to give indications that certain events on a missile have happened and to initiate operations onboard the missile after certain events have happened.

During the period immediately before and immediately after two stages of a missile separate, there is a desired sequence of events to make the separation successful. First, immediately before separation the rocket motor of the lower stage burns out and a ground indication is given that this event has happened. Then the two stages are separated and a ground indication is given that this event has happened. Immediately after the two stages separate, operation of the upper stage is initiated. It is necessary, for a successful operation, that the rocket motor burns out before the two stages separate and it is also necessary that the operation of the upper stage not be initiated until after the two stages separate.

In the past, complicated electrical circuits including storage batteries and switches actuated by timers have been used to perform the sequence of events that occur during the separation of two stages of a missile. These complicated electrical circuits require the use of numerous components. Consequently, the reliability of the system is decreased since when numerous components are used in an electrical circuit, the entire circuit is no more reliable than the weakest component. It must be noted that relays, connectors, resistors, umbilicals, switches, batteries, and other devices for assuring reliability and protection during ground handling and for pad and range safety all contribute to a chance for error and the reduction of the overall system reliability. This invention is not intended to preclude the use of such items in a system or to compromise the safety of personnel or property, but to provide piezoelectric means to accomplish many of these objectives with fewer parts having a high degree of reliability.

It is therefore an object of this invention to provide means for performing the sequence of events that take place during separation of two stages of a missile that are more reliable than means used for the same purpose in the past.

Another object of this invention is to employ piezoelectric means to separate two stages of a missile.

A further object of this invention is to employ piezoelectric means to initiate the operation of an upper stage of a missile upon its separation from a lower stage of the missile.

A still further object of this invention is to employ piezoelectric means to produce a ground indication that the rocket motor on a missile has burned out.

Yet another object of this invention is to employ piezoelectric means to produce a ground indication that two stages of a missile have separated.

Other objects and advantages of this invention will further become apparent hereinafter and in the drawings, in which.

Figure 2:
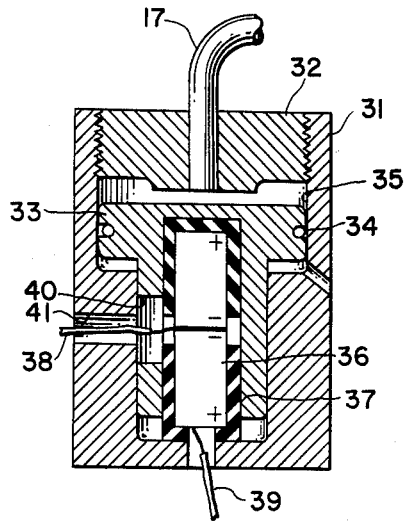
FIG. 2 is a cross-sectional view of the piezoelectric generator used in block 18 of FIG. 1.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Figure 1:
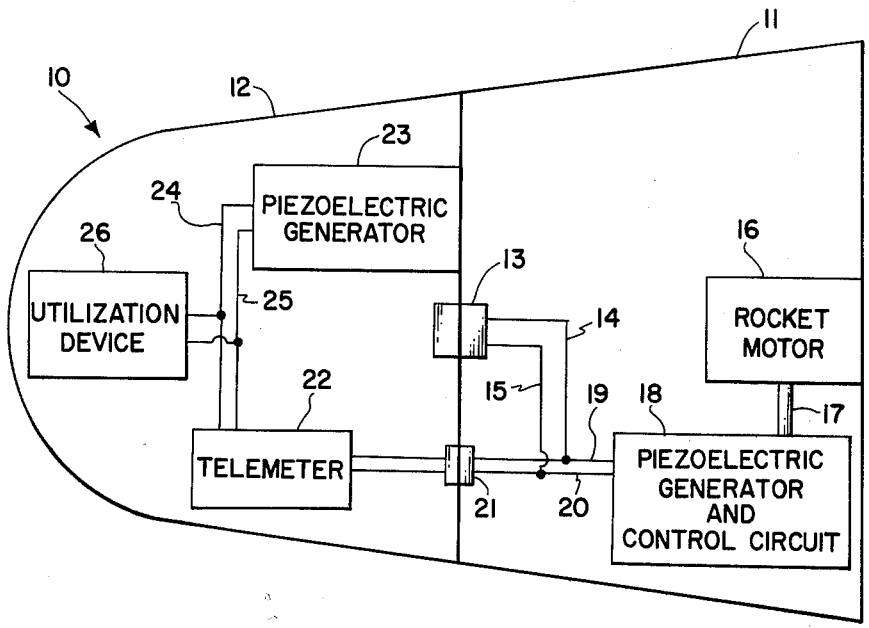
FIG. 1 shows a block diagram of a preferred embodiment of this invention.

Turning now to the specific embodiment of the invention selected for illustration in FIG. 1 of the drawings, the number 10 designates generally a missile having a lower stage 11 and an upper stage 12. Stages 11 and 12 are connected together by a stage separation device 13. Stage separation device 13 holds stages 11 and 12 together until a high voltage pulse appears across electrical lines 14 and 15. Then stage separation device 13 is fired, usually by a pyrotechnic device, causing stage separation device 13 to fall away allowing stages 11 and 12 to separate. Stage separation devices are well known in the prior art; therefore, the specific details of stage separation device 13 will not be described in this specification.

Stage 11 is powered by a rocket motor 16. When rocket motor 16 starts, it creates a pressure which is applied through a pipe 17 to a piezoelectric generator and control circuit 18. This increase in pressure causes piezoelectric generator 18 to generate a pulse which arms the control circuit in block 18. When rocket motor 16 burns out, the pressure in pipe 17 decreases thereby causing the piezoelectric generator to generate another pulse. This pulse appears across electrical lines 19 and 20 and is applied across lines 14 and 15 to stage separation device 13 to cause it to fire. The pulse generated across lines 19 and 20 is also applied through an electrical disconnect device 21 to a telemeter 22 where it is sent to ground to give a ground indication that rocket motor 16 has burned out. This pulse could be applied to a telemeter located on stage 11 thereby eliminating the need for electrical disconnect device 21. This pulse could also be used to initiate operation of stage 12. The piezoelectric generator and control circuit 18 will be described in detail later. Electrical disconnect devices are well known in the prior art; therefore, the details of the electrical disconnect device 21 will not be described in this specification.

When the pulse generated by piezoelectric generator and control circuit 18 is applied to stage separation device 13 the stage separation device is fired causing it to fall away thereby severing all connections between stages 11 and 12 allowing them to separate. A piezoelectric generator 23, the details of which will be disclosed later, is mounted between stages 11 and 12 such that it is compressed when these two stages are connected together. When the two stages 11 and 12 are separated, the piezoelectric generator 23 is allowed to expand thereby generating a pulse across electrical lines 24 and 25. This pulse is applied to telemeter 22 where it is transmitted to ground to give a ground indication that stages 11 and 12 have separated. The pulse generated across lines 24 and 25 is also applied to a utilization device 26 to initiate the operation of stage 12. Utilization device 26 may be any pyrotechnic device such as squibs, primers, initiators, or caps to initiate the operation of stage 12.

Referring now to FIG. 2, there is shown a cross-sectional view of the piezoelectric generator used in block 18 of FIG. 1. A shell or cylinder 31 having a small opening at its bottom and a large opening at its top has a plug 32 screwed into its top to form a pressure-tight fitting. Plug 32 has a small opening in it into which is inserted pipe 17. A piston 33 having a pressure seal 34 is located inside cylinder 31 so that it is free to move up and down. The compartment 35 formed by cylinder 31, plug 32, and piston 33 is pressure tight. A piezoelectric element 36 surrounded by an insulator 37 is located in an opening inside piston 33. The piezoelectric generator 36 can be any well known piezoelectric element. One such piezoelectric element is made by Clevite Corporation of Bedford, Ohio. The Clevite Corporation generator consists of two piezoelectric ceramic slugs ⅜ of an inch in diameter and ¾ of an inch long. The material used is a lead zirconate-lead titanic ceramic. The ends of the slugs are silvered. The material is a good insulator with a relatively high dielectric constant. Thus, the silvered slugs are condensers of rather high capacitance for their size. Two leads, a negative lead 38 and a positive lead 39, are connected to the piezoelectric element 36. The negative lead 38 passes through an opening 40 in piston 33 and through an opening 41 in cylinder 31. The positive lead 39 passes through the small opening at the bottom of cylinder 31. Whenever a pressure is applied to piezoelectric element 36, a pulse is generated across leads 38 and 39 and when this pressure is released another pulse is generated across leads 38 and 39. Consequently, when rocket motor 16 starts, it generates a pressure which is applied through pipe 17 to piston 33 causing piezoelectric element 36 to become compressed thereby generating a pulse across leads 38 and 39. When rocket motor 16 stops, it no longer generates a pressure which allows piezoelectric element 36 to expand thereby generating another pulse across leads 38 and 39.

Figure 3:
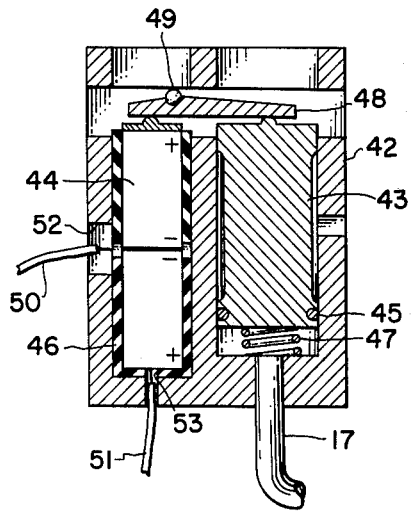
FIG. 3 is a cross-sectional view of an alternative embodiment of the piezoelectric generator used in block 18 of FIG. 1.

An alternative embodiment of the piezoelectric generator in block 18 of FIG. 1 is shown in FIG. 3. In this embodiment the pressure generated by rocket motor 16 is made more effective by means of a lever. This embodiment consists of a shell 42 having two compartments. In one compartment there is located a piston 43 and in the other compartment there is located a piezoelectric element 44. Piston 43 includes a pressure seal 45 and piezoelectric element 44 is surrounded by an insulator 46. A spring 47 is attached to shell 42 and to one end of piston 43. The other end of piston 43 rests against one end of a lever 48 having a pivot 49. The other end of lever 48 rests against one end of piezoelectric element 44. Pipe 17 is inserted into shell 42 to apply pressure to the end of piston 43 to which spring 47 is attached. Negative and positive electrical leads 50 and 51 are connected to piezoelectric element 44 and pass through openings 52 and 53, respectively, in shell 42. When rocket motor 16 starts, it generates a pressure which is applied through pipe 17 to piston 43. This pressure causes piston 43 to move exerting a force against lever 48. This force is transmitted through pivot 49 of lever 48 to piezoelectric element 44 causing it to become compressed thereby generating a pulse across electrical leads 50 and 51. When rocket motor 16 stops, pressure is no longer supplied by pipe 17 which allows spring 47 to pull piston 43 back to its original position. Then, since piston 43 no longer exerts a force against lever 48, piezoelectric element 44 is allowed to expand generating another pulse across electrical leads 50 and 51.

Figure 4:
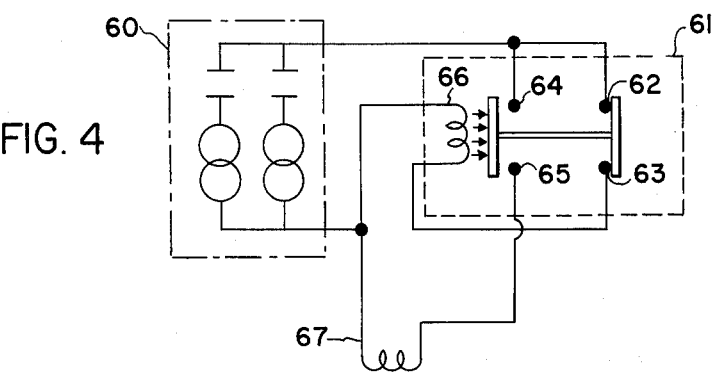
FIG. 4 is a schematic diagram of the circuitry used in block 18 of FIG. 1.

A schematic diagram of the piezoelectric generator and control circuit contained in block 18 of FIG. 1 is shown by FIG. 4. Block 60 is a schematic diagram of an equivalent circuit for either the piezoelectric generator disclosed in FIG. 2 or the piezoelectric generator disclosed in FIG. 3. Block 61 is a schematic diagram of an explosive-actuated switch. Explosive-actuated switches are well known and will therefore not be described in detail in this specification. However, it consists essentially of switch contacts 62, 63, 64, and 65, and a bridge wire 66. Switch contacts 62 and 63 are normally closed, and switch contacts 64 and 65 are normally open. When a pulse is applied across bridge wire 66, the explosive-actuated switch 61 is fired causing switch contacts 62 and 63 to open and causing switch contacts 64 and 65 to close. Bridge wire 66 is connected in series with switch contacts 62 and 63 across piezoelectric generator 60; and a main initiator bridge wire 67 is connected in series with switch contacts 64 and 65 across piezoelectric generator 60. When rocket motor 16 starts, piezoelectric generator 60 generates a pulse which is applied across bridge wire 66. This pulse across bridge wire 66 fires explosive-actuated switch 61 causing switch contacts 62 and 63 to open and causing switch contacts 64 and 65 to close. When rocket motor 16 stops, piezoelectric generator 60 generates another pulse which is applied across the main initiator bridge wire 67. This pulse across bridge wire 67 is applied to stage separation device 13 to separate stages 11 and 12; and it is applied to telemeter 22 which transmits it to give a ground indication that rocket motor 16 has burned out. It should be noted that the pulse applied across bridge wire 66 could also be transmitted to give a ground indication that rocket motor 16 has started. Also, the pulse applied across bridge wire 67 could be used for other purposes than to operate a stage separation device.

Figure 5:
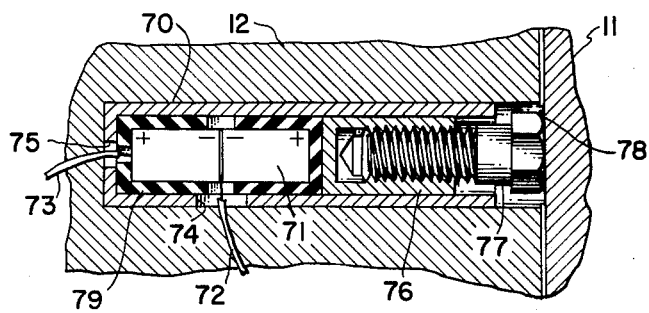
FIG. 5 is a cross-sectional view of the piezoelectric generator used in block 23 of FIG. 1.

Referring now to FIG. 5 there is shown a cross-sectional view of the piezoelectric generator 23 shown in FIG. 1. A cylinder 70 is attached to the wall of stage 12. A piezoelectric element 71 having a negative lead 72 and a positive lead 73 is located inside cylinder 70. Piezoelectric element 71 is surrounded by an insulator 79. Negative lead 72 passes through an opening 74 in cylinder 70 and positive lead 73 passes through an opening 75 in cylinder 70. A jack nut 76 with an adjusting screw 77 screwed therein is slidably mounted in cylinder 70. Cylinder 70 is attached to stage 12 so that when stages 11 and 12 are connected together stage 11 exerts a force against adjusting screw 77 thereby exerting a force against piezoelectric element 71. This can conveniently be done by having a hole 78 in the wall of stage 12 for the head of adjusting screw 77 to fit into. When piezoelectric element 71 is under pressure, the pressure will be exerted by the wall of stage 11. Therefore, when stages 11 and 12 separate the force applied to adjusting screw 77 by the wall stage 11 is relieved thereby relieving the force applied to piezoelectric element 71 causing a pulse to be generated across leads 72 and 73. The amount of force exerted by the wall of stage 11 through adjusting screw 77 to piezoelectric element 71 can be adjusted by adjusting screw 77.

The operation of the preferred embodiment of this invention will now be described while referring to FIGS. 1, 2, 4, and 5. In describing the operation of this invention the piezoelectric generator shown in FIG. 2 will be used as the piezoelectric generator shown in block 60 in FIG. 4. However, it should be noted that the piezoelectric generator in FIG. 3 could also be used as the piezoelectric generator 60 in FIG. 4. Before rocket motor 16 starts, the switch contacts of explosive-actuated switch 61 in FIG. 4 are in the positions shown. That is, contacts 62 and 63 are closed and contacts 64 and 65 are open. In this position, bridge wire 66 is connected in series with switch contacts 62 and 63 across piezoelectric generator 60. When rocket motor 16 starts, it creates a pressure which is applied through pipe 17 to the piezoelectric generator in FIG. 2. This pressure is applied to piston 33 which in turn compresses piezoelectric element 36 causing a pulse to be generated across electrical leads 28 and 29. This pulse is applied through closed switch contacts 62 and 63 to bridge wire 66 causing explosive-actuated switch 61 to fire. When rocket motor 16 burns out, the pressure applied to piston 33 decreases which allows piezoelectric element 36 to expand causing another pulse to be generated across electrical leads 38 and 39. This pulse is applied through close switch contacts 64 and 65 to main initiator bridge wire 67. This pulse across bridge wire 67 is applied to stage separation device 13 to separate stages 11 and 12 and to telemeter 22 to give a ground indication that rocket motor 16 has burned out. When stages 11 and 12 separate the force exerted by jack nut 76 against piezoelectric element is decreased causing a pulse to be generated across electrical leads 72 and 73. This pulse is applied to utilization device 26 to initiate operation of stage 12 and it is applied to telemeter 22 to give a ground indication that stages 11 and 12 have separated.

The principal advantage of this invention over the prior art is its simplicity and reliability because of the few parts necessary to obtain initiation. Other advantages lie in the field of pad and range safety, where live power sources (such as batteries and timers) are presently employed. An example of the advantages of this invention is shown as follows: in FIG. 5 where stage separation must be accomplished before the initiation of subsequent pyrotechnic devices, the invention basically replaces both the power supply (batteries) and the circuit closure devices (switches) in a pyrotechnic circuit. This provides a device which is lighter in weight, insensitive to vibration (no switch chatter), and insensitive to altitude (no battery electrolite boiloff at low vacuum conditions).

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed is:

1. Stage separation control means, on a missile having at least a lower and an upper stage powered by a rocket motor on the lower stage, comprising: stage separation means for connecting said lower and upper stages together until an electric pulse is applied to it and then for severing all connections between the two stages; a first piezoelectric means connected to said rocket motor for generating a first electrical pulse when said rocket motor burns out; means connecting said first electrical pulse to said stage separation means to separate said lower and upper stages; a second piezoelectric means for generating a second electrical pulse when said two stages separate; telemeter means connected to receive said first and second generated electrical pulses for transmitting them to give ground indications that said rocket motor has burned out and that said lower and upper stages have separated; and means receiving said second generated electrical pulse for initiating operation of said upper stage.

2. Stage separation control means as claimed in claim 1 wherein said first piezoelectric means comprises: a piezoelectric element; and means utilizing the pressure generated by said rocket motor for putting said piezoelectric element under pressure from the time that the rocket motor starts until it burns out whereby an electrical pulse is generated by the piezoelectric element when the rocket motor starts and another pulse is generated by the piezoelectric element when the rocket motor burns out.

3. Stage separation control means as claimed in claim 1 wherein said first piezoelectric means comprises: a piezoelectric element; means utilizing the pressure generated by said rocket motor for applying a force to said piezoelectric element from the time that the rocket motor starts until it burns out whereby an electrical pulse is generated by the piezoelectric element when the rocket motor starts and another pulse is generated by the piezoelectric element when the rocket motor burns out; a main initiator bridge wire; and an explosive-actuated switch comprising a bridge wire for firing the switch, a pair of normally closed contacts which open when the switch fires connected in series with said bridge wire for firing the switch and said piezoelectric element, and a pair of normally opened contacts which close when the switch fires connected in series with said main initiator bridge wire and said piezoelectric element.

4. Stage separation control means as claimed in claim 1 wherein said second piezoelectric means comprises: a piezoelectric element, and means for applying a force to said second piezoelectric element while said two stages are attached and for removing said force when said two stages separate whereby a pulse is generated by said piezoelectric element when said two stages separate.

5. Means on a missile having at least a lower and an upper stage powered by a rocket motor on the lower stage, for separating said lower and upper stages on burnout of said rocket motor comprising: stage separation means for connecting said lower and upper stages together until an electric pulse is applied to it and then for severing all connections between the two stages; a piezoelectric means connected to said rocket motor for generating an electrical pulse when said rocket motor burns out; and means for transmitting said generated electrical pulse to said stage separation means whereby when said rocket motor burns out said lower and upper stages separate.

6. Means as claimed in claim 5 wherein said piezoelectric means comprises: a piezoelectric element; a means utilizing the pressure generated by said rocket motor for putting said piezoelectric element under pressure from the time that the motor starts until it burns out whereby an electrical pulse is generated by the piezoelectric element when the rocket motor starts and another pulse is generated by the piezoelectric element when the rocket motor burns out.

7. Means as claimed in claim 5 wherein said piezoelectric means comprises: a piezoelectric element; means utilizing the pressure generated by said rocket motor for applying a force to said piezoelectric element from the time that the rocket motor starts until it burns out whereby an electric pulse is generated by the piezoelectric element when the rocket motor starts and another pulse is generated by the piezoelectric element when the rocket motor burns out; a main initiator bridge wire for activating said stage separation device when a pulse is applied across it; and an explosive-actuated switch comprising a bridge wire for firing the switch, a pair of normally closed contacts which open when the switch fires connected in series with said piezoelectric element and said bridge wire for firing the switch, and a pair of normally opened contacts which close when the switch fires connected in series with said piezoelectric element and said main initiator bridge wire.

8. Means on a missile having at least a lower and an upper stage for generating an electrical pulse, when the two stages separate, that can be used to fire a pyrotechnic device and to give a ground indication that the two stages have separated comprising: a piezoelectric element; and means for applying a force to said piezoelectric element while said two stages are attached and for removing said force when said two stages separate whereby a pulse is generated by said piezoelectric element when said two stages separate.

9. Means for generating an electrical pulse at the instant two structures separate comprising: a piezoelectric element; and means for applying a force to said piezoelectric element while said two structures are attached to each other and for removing said force at the instant said two structures are separated whereby an electrical pulse is generated by said piezoelectric element at the instant said two structures separate.

10. Means for generating an electrical pulse at the instant a first structure and a second structure separate comprising: an elongated shell having one end opened and the other end closed; a piezoelectric element located inside said shell with one of its ends in contact with said closed end; a piston-like structure slidably located inside said shell in contact with the other end of said piezoelectric element; a hole in a wall of said first structure through which said piston-like structure can pass; the said open end of said shell being attached to said wall of said first structure in such a manner as to allow said piston-like structure to pass through said hole and contact said second structure to exert a force against said piezoelectric element whereby when said first structure and said second structure separate said force is removed causing said piezoelectric element to generate an electrical pulse.

11. Means as claimed in claim 10 wherein said piston-like structure consists of a jack nut with an adjusting screw, screwed therein whereby the amount of force exerted by the said second structure against said piezoelectric element can be adjusted.

12. Means as claimed in claim 10 wherein there are small openings in said shell for electrical leads connected to said piezoelectric element to pass through.

13. Means for generating a pulse at the beginning of a pressure and for generating another pulse at the end of the pressure comprising: a piezoelectric element; a piston; means for transmitting any pressure applied to said piston to said piezoelectric element; and means for applying said pressure to said piston whereby said piezoelectric element generates a pulse at the beginning of said pressure and another pulse at the end of said pressure.

14. Means as claimed in claim 13 wherein said means for transmitting any pressure applied to said piston to said piezoelectric element includes means for putting said piston in direct contact with said piezoelectric element.

15. Means as claimed in claim 13 wherein said means for transmitting any pressure applied to said piston to said piezoelectric element includes a lever.

16. Means for generating a pulse at the end of a pressure comprising: a piezoelectric element; a piston; means for transmitting any pressure applied to said piston to said piezoelectric element; means for applying said pressure to said piston whereby said piezoelectric element generates a pulse at the beginning of said pressure and another pulse at the end of said pressure; and means for eliminating said pulse generated at the beginning of said pressure.

17. Means as claimed in claim 16 wherein said means for eliminating said pulse generated at the beginning of said pressure comprises: an electrical circuit element; and an explosive-actuated switch comprising a bridge wire for firing the switch, a pair of normally closed contacts which open when the switch fires connected in series with said piezoelectric element and said bridge wire, and a pair of normally opened contacts which close when the switch fires connected in series with said piezoelectric element and said electrical circuit element whereby only the pulse generated at the end of the pressure will pass through the electrical circuit element.

18. Means for generating an electrical pulse at the instant a first stage and a second stage of a missile separate comprising: an elongated shell having one end opened and the other end closed; a piezoelectric element located inside said shell with one of its ends in contact with said closed end; a piston-like structure slidably located inside said shell in contact with the other end of said piezoelectric element; a hole in the wall of said first stage through which said piston-like structure can pass; the said open end of said shell being attached to said wall of said first stage in such a manner as to allow said piston-like structure to pass through said hole and contact said second stage to exert a force against said piezoelectric element whereby when said first stage and said second stage separate, said force is removed causing piezoelectric element to generate an electrical pulse.

19. Means in accordance with claim 18 wherein said piston-like structure consists of a jack nut with an adjusting screw, screwed therein whereby the amount of force exerted by said second stage against said piezoelectric element can be adjusted.

20. Means in accordance with claim 18 wherein there are small openings in said shell for electrical leads connected to said piezoelectric element to pass through.

21. Means on a missile for generating a pulse at the beginning of a pressure generated by a rocket motor on the missile and for generating another pulse at the end of the pressure comprising: a piezoelectric element; a piston; means for transmitting any pressure applied to said piston to said piezoelectric element; and means for applying the pressure generated by said rocket motor to said piston whereby said piezoelectric element generates a pulse at the beginning of said rocket motor pressure and another pulse at the end of said rocket motor pressure.

22. Means in accordance with claim 21 wherein said means for transmitting any pressure applied to said piston to said piezoelectric element includes means for putting said piston in direct contact with said piezoelectric element.

23. Means in accordance with claim 21 wherein said means for transmitting any pressure applied to said piston to said piezoelectric element includes a lever.

24. Means on a missile for generating a pulse at the end of a pressure generated by a rocket motor on the missile comprising: a piezoelectric element; a piston; means for transmitting any pressure applied to said piston to said piezoelectric element; means for applying said pressure generated by said rocket motor to said piston whereby said piezoelectric element generates a pulse at the beginning of said rocket motor pressure and another pulse at the end of rocket motor pressure; and means for eliminating said pulse generated at the beginning of said rocket motor pressure.

25. Means in accordance with claim 24 wherein said means for eliminating said pulse generated at the beginning of said rocket motor pressure comprises: an electrical circuit element; and an explosive-actuated switch comprising a bridge wire for firing the switch, a pair of normally closed contacts which open when the switch fires connected in series with said piezoelectric element and said bridge wire, and a pair of normally opened contacts which close when the switch fires connected in series with said piezoelectric element and said electrical circuit element whereby only the pulse generated at the end of the pressure will pass through the electrical circuit element.

References Cited by the Examiner

UNITED STATES PATENTS

| | | | |
|---|---|---|---|
| 3,034,001 | 5/1962 | King | 310—8.7 |
| 3,067,682 | 12/1962 | Feldmann et al. | 102—49 |
| 3,132,590 | 5/1964 | Hall | 102—49 |
| 3,158,763 | 12/1964 | Busch et al. | 310—8.7 |

BENJAMIN A. BORCHELT, *Primary Examiner.*

V. R. PENDEGRASS, *Assistant Examiner.*